(12) United States Patent
Zhang et al.

(10) Patent No.: US 12,033,345 B2
(45) Date of Patent: Jul. 9, 2024

(54) POSITIONING METHOD AND DEVICE, AND STORAGE MEDIUM

(71) Applicant: KunShan Go-Visionox Opto-Electronics Co., Ltd, Jiangsu (CN)

(72) Inventors: Yuan Zhang, Kunshan (CN); Naixi Chen, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 423 days.

(21) Appl. No.: 17/463,771

(22) Filed: Sep. 1, 2021

(65) Prior Publication Data

US 2021/0398311 A1 Dec. 23, 2021

Related U.S. Application Data

(63) Continuation of application No. PCT/CN2020/084901, filed on Apr. 15, 2020.

(30) Foreign Application Priority Data

Aug. 28, 2019 (CN) .......................... 201910802721.7

(51) Int. Cl.
*G06T 7/70* (2017.01)
*G06T 7/00* (2017.01)
(Continued)

(52) U.S. Cl.
CPC .............. *G06T 7/70* (2017.01); *G06T 7/0004* (2013.01); *G06T 7/13* (2017.01); *G06T 7/50* (2017.01);
(Continued)

(58) Field of Classification Search
CPC .......... G06T 7/70; G06T 7/0004; G06T 7/13; G06T 7/50; G06T 2207/30108;
(Continued)

(56) References Cited

U.S. PATENT DOCUMENTS 8,995,773 B2 3/2015 Kurihara
2006/0285743 A1 12/2006 Oh et al.
(Continued)

FOREIGN PATENT DOCUMENTS

CN 103150735 A 6/2013
CN 103760165 A 4/2014
(Continued)

OTHER PUBLICATIONS

The Notice of Preliminary Office Action issued on Oct. 4, 2022, in connection with corresponding Japanese Application No. 2021-559289 (6 pages).
(Continued)

*Primary Examiner* — Wesley J Tucker
(74) *Attorney, Agent, or Firm* — Maier & Maier, PLLC

(57) ABSTRACT

A positioning method including: acquiring a gray-scale image of an object to be measured to determine a gray-scale value of each pixel on the gray-scale image; determining a target area to be measured and a first gray-scale change area adjacent to the target area to be measured based on the gray-scale value of each pixel; determining a target gray-scale value based on a gray-scale value of the target area to be measured and a gray-scale value of each pixel in the first gray-scale change area; determining target pixels that conform to the target gray-scale value in the first gray-scale change area, to use the target pixels as actual edge pixels of the target area to be measured; and determining a relative
(Continued)

distance between a center position of the target area to be measured and a reference position, to obtain position information of the target area.

17 Claims, 3 Drawing Sheets

(51) Int. Cl.
    *G06T 7/13* (2017.01)
    *G06T 7/50* (2017.01)
    *G06V 10/22* (2022.01)

(52) U.S. Cl.
    CPC ............ *G06V 10/22* (2022.01); *G06T 2207/30108* (2013.01); *G06V 2201/06* (2022.01)

(58) Field of Classification Search
    CPC .......... G06T 7/12; G06T 7/136; G06T 2207/30121; G06T 7/73; G06T 7/11; G06T 7/66; G06T 2207/10004; G06V 10/22; G06V 2201/06
    See application file for complete search history.

(56) References Cited

U.S. PATENT DOCUMENTS

| | | | |
|---|---|---|---|
| 2012/0206410 A1 | 8/2012 | Chang | |
| 2013/0033476 A1* | 2/2013 | Dean | G09G 3/344 345/107 |
| 2014/0306109 A1* | 10/2014 | Sun | H01J 37/26 250/307 |
| 2015/0187064 A1* | 7/2015 | Huang | G06T 7/0004 382/141 |
| 2016/0246026 A1 | 8/2016 | Shi et al. | |
| 2016/0307062 A1 | 10/2016 | Cui et al. | |
| 2017/0061649 A1* | 3/2017 | Kurihara | G01B 11/02 |

FOREIGN PATENT DOCUMENTS

| | | |
|---|---|---|
| CN | 104078011 A | 10/2014 |
| CN | 104792263 A | 7/2015 |
| CN | 105457908 A | 4/2016 |
| CN | 106446908 A | 2/2017 |
| CN | 107909610 A | 4/2018 |
| CN | 108109133 A | 6/2018 |
| CN | 109035326 A | 12/2018 |
| CN | 109580632 A | 4/2019 |
| CN | 109592342 A | 4/2019 |
| CN | 109903717 A | 6/2019 |
| CN | 110517318 A | 11/2019 |
| DE | 102017216600 A1 | 3/2019 |
| JP | H05180618 A | 7/1993 |
| JP | H0653700 A | 2/1994 |
| JP | 2001134771 A | 5/2001 |
| JP | 2011179974 A | 9/2011 |
| JP | 2012008619 A | 1/2012 |
| JP | 2012073177 A | 4/2012 |
| WO | 2015/100777 A1 | 7/2015 |

OTHER PUBLICATIONS

Wu et al. "A new method edge-gray-based attaining the threshold of image-binaried." Engineering Journal of Wuhan University. vol. 36, No. 3A. Jun. 2003. pp. 165-169. English Abstract provided.
Dharwadkar et al. "An Adaptive Gray-Scale image Watermarking Scheme using Smooth and Edge areas of an mage." 2013 International Conference on Intelligent Systems and Signal Processing (ISSP). Jun. 10, 2013. pp. 66-71.
Chinese Office Action issued on Aug. 30, 2021, in connection with corresponding CN application No. 201910802721.7 (21 pp., including machine-generated English translation).
Extended European Search Report issued on Apr. 26, 2022 in corresponding European Application No. 20857304.8; 9 pages.
PCT International search report for PCT Application No. PCT/CN2020/084901, dated Jun. 30, 2020, 7 pages.
Yue Jiang et al. "A Target Extraction Method of Infrared Image Based on Edge and Transition Region", Spectroscopy and Spectral Analysis vol. 38, No. 6, dated Jun. 30, 2018, 7 pages.

* cited by examiner

POSITIONING METHOD AND DEVICE, AND STORAGE MEDIUM

CROSS-REFERENCE TO RELATED APPLICATION

This application is a continuation of International Application No. PCT/CN2020/084901, filed on Apr. 15, 2020, which claims priority to Chinese Patent Application No. 201910802721.7, filed on Aug. 28, 2019 and titled "POSITIONING METHOD AND DEVICE, STORAGE MEDIUM", both of which are incorporated herein by reference in their entireties.

FIELD

The present application relates to a field of computer technology, and particularly, to a positioning method and device, and a storage medium.

BACKGROUND

In a production process of a product, a position or size of the product needs to be measured to control the quality of the product. Exemplarily, in the display panel industry, it is necessary to more accurately determine a position of a target area in a display panel, for example, a position of an encapsulation area, a position of pixel evaporation, and so on. Nevertheless, in the prior art, a position of a target area is usually determined by manual measurement after acquiring an image of an object to be measured. However, measurement error of manual measurement is large, and thus the position of the target area cannot be accurately determined.

Therefore, how to accurately determine a position of a target area is an urgent technical problem to be solved by those skilled in the art.

SUMMARY

According to a first aspect of the present application, there is provided a positioning method including: acquiring a gray-scale image of an object to be measured, and determining a gray-scale value of each pixel on the gray-scale image; determining a target area to be measured in the gray-scale image and a first gray-scale change area adjacent to the target area to be measured based on the gray-scale value of each pixel on the gray-scale image; determining a target gray-scale value based on a gray-scale value of the target area to be measured and a gray-scale value of each pixel in the first gray-scale change area; determining target pixels that conform to the target gray-scale value in the first gray-scale change area, to use the target pixels as actual edge pixels of the target area to be measured; and determining a relative distance between a center position of the target area to be measured and a reference position based on the actual edge pixels of the target area to be measured, to obtain position information of the target area to be measured.

According to a second aspect of the present application, there is provided a positioning device including: an image acquisition module configured to acquire a gray-scale image of an object to be measured, and to determine a gray-scale value of each pixel on the gray-scale image; an area identification module configured to determine a target area to be measured in the gray-scale image and a first gray-scale change area adjacent to the target area to be measured based on the gray-scale value of each pixel on the gray-scale image; a target gray-scale determination module configured to determine a target gray-scale value based on a gray-scale value of the target area to be measured and a gray-scale value of each pixel in the first gray-scale change area; an edge determination module configured to determine target pixels that conform to the target gray-scale value in the first gray-scale change area, to use the target pixels as actual edge pixels of the target area to be measured; and a position determination module configured to determine a relative distance between a center position of the target area to be measured and a reference position based on the actual edge pixels of the target area to be measured, to obtain position information of the target area to be measured.

According to a third aspect of the present application, there is provided a storage medium storing a program thereon, wherein the program, when executed by a processor, implements the positioning method described above.

According to the positioning method provided by embodiments of the present application, the method determines a target area to be measured and a first gray-scale change area adjacent to the target area to be measured by acquiring a gray-scale image of an object to be measured and based on a gray-scale value of each pixel on the gray-scale image, determines a target gray-scale value using the target area to be measured and the first gray-scale change area, and determines actual edge pixels of the target area to be measured in the first gray-scale change area using the target gray-scale value, and thus determines a relative distance between a center position of the target area to be measured and a reference position, to obtain position information of the target area to be measured. On one hand, a boundary of the target area to be measured can be determined more accurately, and thus a position of the target area to be measured can be determined more accurately. On the other hand, according to embodiments of the present application, manual measurement with naked eyes is not required, and automatic measurement can be realized and efficiency can be improved.

DETAILED DESCRIPTION

In a display panel using a Frit Encapsulation, Frit can achieve a function of isolating water and oxygen during an encapsulation process. It is necessary to accurately determine a position of a Frit encapsulation area in the display panel to prevent the Frit encapsulation area from being damaged during cutting and thus resulting in an encapsulation failure. Alternatively, in a display panel using a Thin-Film Encapsulation (TFE), a Chemical Vapor Deposition (CVD) process can be used to form some encapsulation film layers in an encapsulation structure. During a film-formation process, a CVD shadow may appear at a boundary of the encapsulation film layers. The CVD shadow will directly affect the encapsulation effect. For example, if a position of the CVD shadow exceeds a control range, the encapsulation will fail, and black spots and dark spots, etc. will appear after the display panel is lit. Alternatively, in the evaporation Pixel Position Accuracy (PPA) measurement technology of the display panel, the evaporation PPA is an important reference index for evaluating an evaporation process, and a PPA offset will cause abnormalities such as color mixing on the display panel. It is necessary to determine an actual evaporation position of a sub-pixel to determine a PPA compensation value so as to prevent abnormalities such as color mixing on the display panel.

However, in the prior art, positions of the above-mentioned areas are measured by naked eyes artificially, causing problems such as large error and low efficiency.

In order to solve at least one of the existing technical problems, embodiments of the present application provide a positioning method, device, and storage medium. The positioning method provided by the embodiments of the present application is introduced below first.

Figure 1:
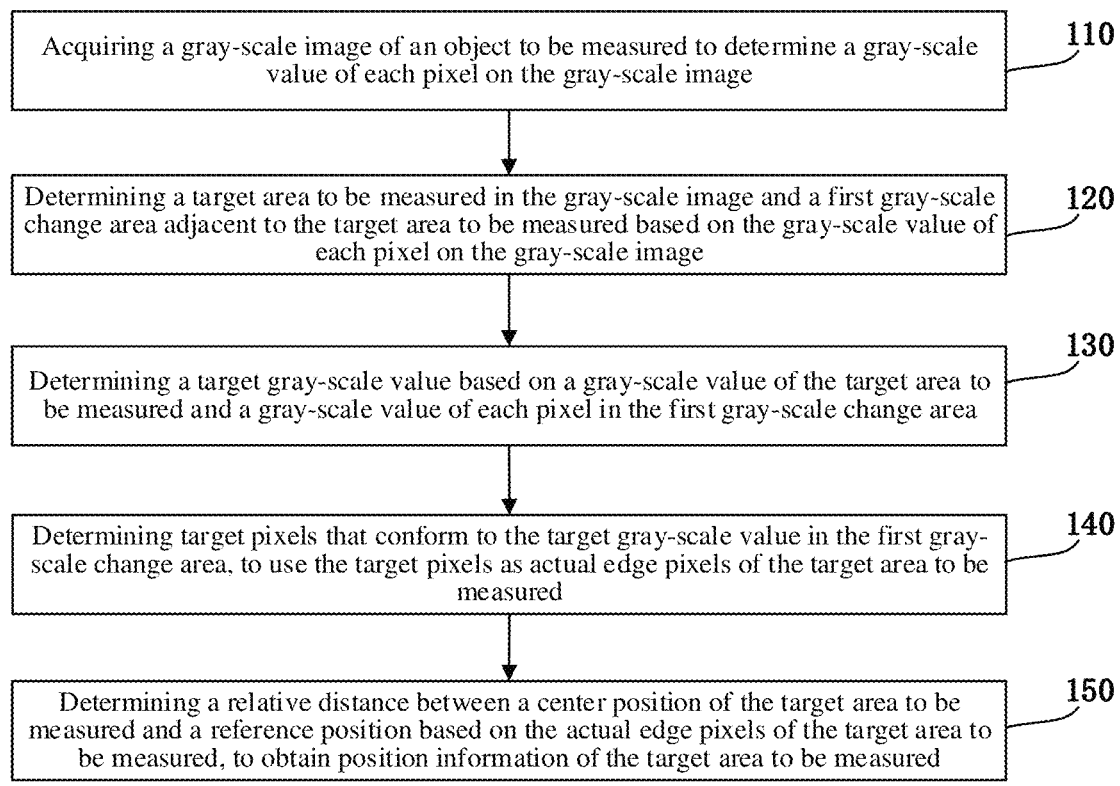
FIG. 1 is a schematic flowchart of a positioning method provided by an embodiment of the present application.

FIG. 1 shows a schematic flowchart of a positioning method provided by an embodiment of the present application. As shown in FIG. 1, the positioning method provided by the embodiment of the present application may include step 110 to step 150.

In step 110, a gray-scale image of an object to be measured may be acquired to determine a gray-scale value of each pixel on the gray-scale image.

In this step, exemplarily, the object to be measured may be, for example, a display panel, a semiconductor chip, a solar cell panel, and the like.

Optionally, an Automated Optical Inspection (AOI) camera, a Charge Coupled Device (CCD) camera, an image capture card, etc. can be used to acquire an original image of the object to be measured. A format of the original image may be bmp, jpg, png, etc., and then gray-scale processing may be performed on the original image to obtain the gray-scale image of the object to be measured. The gray-scale image may be a collection of pixel dot matrixes. Each pixel may have a corresponding gray-scale value. By reading the gray-scale value of each pixel on the gray-scale image and using a pixel as a positioning granularity, each area on the gray-scale image can be identified more accurately.

In step 120, a target area to be measured in the gray-scale image and a first gray-scale change area adjacent to the target area to be measured may be determined based on the gray-scale value of each pixel on the gray-scale image.

Figure 2:
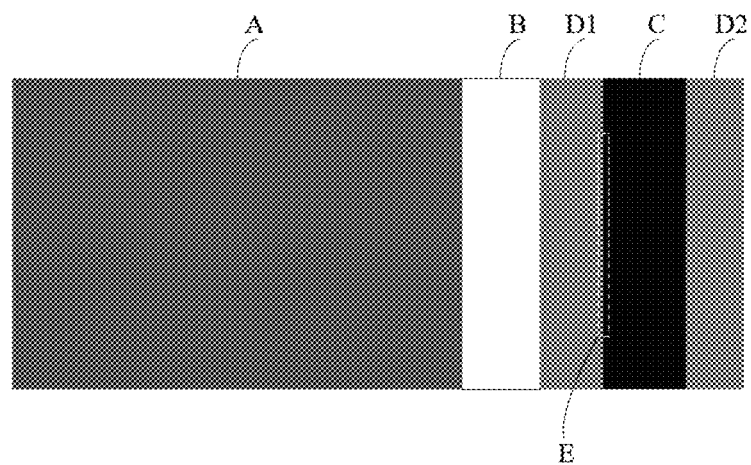
FIG. 2 is a schematic diagram of a gray-scale image of an object to be measured provided by an embodiment of the present application.
Figure 3:
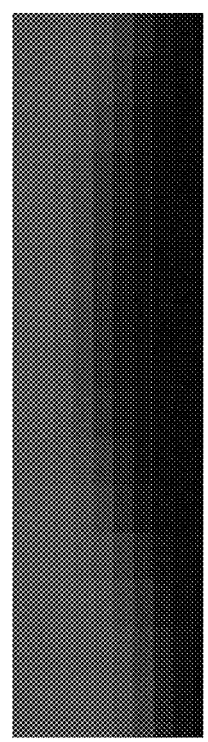
FIG. 3 is an enlarged schematic diagram of area E in FIG. 2 provided by an embodiment of the present application.

Exemplarily, as an example, taking a display panel using a Frit Encapsulation as the object to be measured, an AOI color camera may be used and a stable light source intensity may be set to take a picture of a measurement area of the display panel to obtain a color picture of the measurement area, wherein a display area of the display panel may appear blue, a molybdenum line area may appear white, and a Frit area may appear black in the obtained color picture. Gray-scale processing may be performed on the color picture to obtain the gray-scale image of the display panel as shown in FIG. 2. The gray-scale image may include the display area A, the molybdenum line area B, the Frit area C, and glass plate areas D1 and D2 on two sides of the Frit area C. In the gray-scale image, the display area A, the molybdenum line area B, the Frit area C, and the glass plate areas D1 and D2 may all maintain a certain gray-scale value, and the gray-scale value of each area may be different (the gray-scale values of the glass plate areas D1 and D2 may be the same), and there is an gray-scale change area at a boundary of each area. Taking a left boundary of the Frit area C in FIG. 2 as an example, it appears to naked eyes that the Frit area C and glass plate area D1 are next to each other. In fact, the Frit area C has a first gray-scale value, the glass plate area D1 has a second gray-scale value, and there is a first gray-scale change area between the two areas. As shown in FIG. 3, it is an enlarged schematic diagram of a first gray-scale change area E at the left boundary of the Frit area C.

Optionally, the step 120 may include: determining a first gray-scale value and a second gray-scale value based on the gray-scale value of each pixel on the gray-scale image; identifying a first pixel in the gray-scale image with a gray-scale value equal to the first gray-scale value, to determine an area where the first pixel is located as the target area to be measured; identifying a second pixel in the gray-scale image with a gray-scale value between the first gray-scale value and the second gray-scale value; and determining an area where the second pixel is located as the first gray-scale change area.

Exemplarily, as an example, taking the Frit area C in FIG. 2 as the target area to be measured, the first gray-scale change area is located at the boundary of the Frit area C. Based on a positional relationship of each area in the display panel (for example, the display area A is next to the molybdenum line area B, and two sides of the Frit area C are adjacent to the glass plate areas D1 and D2 respectively) and the gray-scale value of each pixel on the gray-scale image, the first gray-scale value of the Frit area C and the second gray-scale value of the glass plate areas D1 and D2 may be identified, an area where a first pixel in the gray-scale image with a gray-scale value equal to the first gray-scale value is located may be taken as the Frit area C, and an area where a second pixel in the gray-scale image with a gray-scale value between the first gray-scale value and the second gray-scale value is located may be taken as the first gray-scale change area. In an ideal situation, the first gray-scale value and the second gray-scale value may be two different specific values. It should be understood that, due to an influence of a technological process and an image capture device, the first gray-scale value may also be a relatively small numerical range, and the same is true for the second gray-scale value. At this time, the determined Frit area C (that is, the target area to be measured) is a rough area. The following embodiments will introduce determination of an actual boundary of the target area to be measured in the first gray-scale change area at the boundary of the target area to be measured.

In step 130, a target gray-scale value may be determined based on a gray-scale value of the target area to be measured and a gray-scale value of each pixel in the first gray-scale change area.

Optionally, an average value of gray-scale values of pixels on or near a center line of the first gray-scale change area may be used as the target gray-scale value. Alternatively, the target gray-scale value may be determined based on an actual need. For example, continuing to take the Frit area C as the target area to be measured, and to use the area between the Frit area C and glass plate area D1 as the first gray-scale change area, the Frit area C has a first gray-scale value, the glass plate area D1 has a second gray-scale value, the first gray-scale value is smaller than the second gray-scale value, and the gray-scale value of each pixel in the first gray-scale change area is between the first gray-scale value and the second gray-scale value. For example, if a range of the Frit area C needs to be determined to be larger, then gray-scale values of some pixels in the first gray-scale change area may be used as the target gray-scale value. Exemplarily, a difference between the gray-scale values of these pixels and the first gray-scale value may be about 50% of a difference between the second gray-scale value and the first gray-scale value.

Optionally, the step 130 may include: determining multiple groups of candidate pixels in the first gray-scale change area based on the gray-scale value of each pixel in the first gray-scale change area, wherein for each of the multiple groups of candidate pixels, a difference between gray-scale values of the candidate pixels is greater than a first preset threshold and the candidate pixels are adjacent to each other; and determining, an average value of gray-scale values of the multiple groups of candidate pixels being close to the gray-scale value of the target area to be measured, as the target gray-scale value.

As shown in FIGS. 2 and 3, the Frit area C has a first gray-scale value, and the glass plate area D1 has a second gray-scale value. In the first gray-scale change area, a gray-scale value of a pixel near the Frit area C is close to the first gray-scale value, and a gray-scale value of a pixel near the glass plate area D1 is close to the second gray-scale value. In a direction from the Frit area C to the glass plate area D1, gray-scale value of pixels in the first gray-scale change area change from the first gray-scale value to the second gray-scale value, and there are some adjacent pixels with gray-scale values having a jumped change in the first gray-scale change area (gray-scale values of two adjacent pixels have a large difference). A first preset threshold may be set based on the first gray-scale value and the second gray-scale value, and multiple groups of candidate pixels may be determined, wherein for each of the multiple groups of candidate pixels, a difference between gray-scale values of two adjacent pixels is greater than the first preset threshold. For any of the multiple groups of candidate pixels, a gray-scale value of one pixel is close to the first gray-scale value, and a gray-scale value of the other pixel is close to the second gray-scale value. An average value of gray-scale values of pixels in the multiple groups of candidate pixels being close to the first gray-scale value (that is, the gray-scale value of the target area to be measured) may be calculated, and the average value may be used as the target gray-scale value.

The foregoing embodiments only use one boundary of the target area to be measured as an example to illustrate steps of determining the target gray-scale value. A target gray-scale value corresponding to any other boundary of the target area to be measured may be determined based on the above described method, which will not be detailed repeatedly.

Based on the embodiments of the present application, the target gray-scale value may be determined more accurately, and an actual boundary of the target area to be measured may be determined more accurately based on the target gray-scale value.

In step 140, target pixels that conform to the target gray-scale value may be determined in the first gray-scale change area, and the target pixels may be used as actual edge pixels of the target area to be measured.

Optionally, determining the target pixels that conform to the target gray-scale value in the first gray-scale change area in step 140 may include: determining M pixels in the first gray-scale change area based on the gray-scale value of each pixel in the first gray-scale change area and the target gray-scale value, wherein each of the M pixels has a gray-scale value equal to the target gray-scale value; and determining N pixels from the M pixels to use the N pixels as the target pixels, wherein a shape formed by a connection of the N pixels is similar to a shape of the target area and a ratio of N to M is greater than a second preset threshold, where and M and N are both positive integers greater than 1.

In this step, the M pixels in the first gray-scale change area that conform to the target gray-scale value may be randomly distributed, while the shape of the target area to be measured is fixed. N pixels are selected from the M pixels and the ratio of N to M is greater than the second preset threshold, and the shape formed by the connection of the N pixels is similar to the shape of the target area to be measured, which can more accurately determine the actual edge pixels of the target area to be measured.

Optionally, the target area to be measured may be a circular area, and corresponding first gray-scale change area may be an annular area surrounding the target area to be measured. Alternatively, the target area to be measured may be a polygon, and if gray-scale value change trends of first gray-scale change areas corresponding to each side of the target area to be measured are not the same, the actual edge pixels corresponding to each boundary may be determined respectively.

In step 150, a relative distance between a center position of the target area to be measured and a reference position may be determined based on the actual edge pixels of the target area to be measured, to obtain position information of the target area to be measured.

Optionally, the reference position may be a fixed position on the gray-scale image or a relatively stable position on the gray-scale image. Using the reference position as a reference to determine the relative distance between the center position of the target area to be measured and the reference position, the obtained position information of the target area to be measured is more accurate.

Optionally, the actual edge pixels of the target area to be measured may include actual edge pixels of a first edge of the target area to be measured and actual edge pixels of a second edge of the target area to be measured, the center position of the target area to be measured may be a center line of the target area to be measured, the reference position may be a reference straight line, and the first edge, the second edge, the center line and the reference straight line may be parallel to each other. Optionally, the step 150 may include: acquiring a number and size of pixels between the first edge and the reference straight line and between the second edge and the reference straight line respectively in a direction perpendicular to the first edge; calculating a relative distance between the first edge and the reference straight line and a relative distance between the second edge and the reference straight line respectively based on the number and size of pixels; and determining a relative distance between the center line of the target area to be measured and the reference straight line based on the relative distance between the first edge and the reference straight line and the relative distance between the second edge and the reference straight line.

As shown in FIG. 2, as an example, continuing to take the Frit area C as the target area to be measured, an edge of the Frit area C adjacent to the glass plate area D1 may be taken as a first edge of the Frit area C, and an edge of the Frit area C adjacent to the glass plate area D2 may be taken as a second edge of the Frit area C. The reference position may be acquired in advance, or calculated based on the acquired gray-scale image. The reference position may be a reference straight line, and the reference straight line may be an indication of a position of a structure with a relatively stable position in the display panel in the gray-scale image, for example, the reference straight line may be an edge line of the display area A close to the Frit area C.

In a direction perpendicular to the first edge of the Frit area C, that is, in a horizontal direction in FIG. 2, the number of pixels between the first edge and the reference straight line is $\Delta X1$, the pixel size is pixel, and pixel is a size of each pixel in the gray-scale image, which is generally in μm ($10^{-6}$ m), then the relative distance L1 between the first edge and the reference straight line is $\Delta X1*\text{pixel}$. Similarly, the number of pixels between the second edge and the reference straight line is $\Delta X2$, and the pixel size is pixel, then the relative distance L2 between the second edge and the reference straight line is $\Delta X2*\text{pixel}$. An average value of L1 and L2 may be calculated to obtain the relative distance between the Frit area C and the reference straight line.

Optionally, after the step 150, the positioning method provided by the embodiments of the present application may further include: determining a width dimension of the target area to be measured in the direction perpendicular to the first edge, based on the relative distance between the first edge and the reference straight line and the relative distance between the second edge and the reference straight line.

As shown in FIG. 2, as an example, continuing to take the Frit area C as the target area to be measured, after determining the relative distance between the Frit area C and the reference straight line, a width of the Frit area C also needs to be determined. In this way, based on the relative distance between the Frit area C and the reference straight line and the width of the Frit area C, a cutting position of the display panel may be determined more accurately to prevent the Frit encapsulation area from being damaged. In addition, the measured relative distance between the Frit area C and the reference straight line and the width of the Frit area C may be compared with a preset value to determine whether a Frit encapsulation position and size meet a preset requirement.

Optionally, the positioning method provided by the embodiments of the present application may further include: determining a reference area in the gray-scale image and a second gray-scale change area adjacent to the reference area based on the gray-scale value of each pixel on the gray-scale image; and determining actual edge pixels of the reference area in the second gray-scale change area to use a straight line where the actual edge pixels of the reference area are located as the reference straight line.

Exemplarily, the reference area may be an area of a structure with a relatively stable position on the object to be measured on the gray-scale image. Taking an edge of the reference area as the reference straight line, the obtained position information of the object area to be measured is more accurate.

As shown in FIG. 2, as an example, taking the display area A as the reference area and taking the Frit area C as the target area to be measured, in general, the display area A is an area with a relatively stable position and occupies a relatively large area on the display panel (the display area A in FIG. 2 may be a part of actual display area). A line where actual edge pixels of the display area A are located may be selected as the reference straight line. Preferably, the reference straight line may be an edge of the display area A close to the Frit area C.

For example, based on a positional relationship of each area in the display panel (the display area A is next to the molybdenum line area B) and the gray-scale value of each pixel on the gray-scale image, a third gray-scale value of the display area A and a fourth gray-scale value of the molybdenum line area B may be identified, an area where a third pixel in the gray-scale image with a gray-scale value equal to the third gray-scale value is located may be taken as the display area A, and an area where a fourth pixel in the gray-scale image with a gray-scale value between the third gray-scale value and the fourth gray-scale value is located may be taken as the second gray-scale change area. Further, a target gray-scale value corresponding to the display area A may be determined based on the method described above, and actual edge pixels of the display area A may be determined in the second gray-scale change area based on the target gray-scale value corresponding to the display area A, which will not be detailed repeatedly.

Optionally, the center position of the target area to be measured may be a measurement center point position of the target area to be measured, and the reference position may be a preset center point position corresponding to the target area to be measured. Optionally, the step 150 may include: determining a shape of the target area to be measured based on the actual edge pixels of the target area to be measured; comparing the shape of the target area to be measured with a preset shape to obtain a similarity between the shape of the target area to be measured and the preset shape; and calculating a relative distance between the measurement center point position of the target area to be measured and the preset center point position when the similarity is greater than a third preset threshold.

Exemplarily, the target area to be measured may be an actual evaporation area of a sub-pixel, and the measurement center point position may be an actual center point position of the measured actual evaporation area of the sub-pixel. The preset shape may be a preset standard evaporation shape of the sub-pixel, such as a quadrilateral, a hexagon, and the like. The preset center point position may be a standard center point position of the sub-pixel.

Exemplarily, a position of an opening area defined by a Pixel Definition Layer (PDL) corresponding to a standard Array process and the standard evaporation shape may be pre-entered by graphic Teach means, and a standard center point position of each sub-pixel may be determined based on the pre-entered position of the opening area defined by the PDL.

For example, the preset standard evaporation shape may be a hexagon, while the measured actual evaporation shape may be a quadrilateral, then the measurement center point position calculated based on the quadrilateral may be a position with a large error, and if it is continued to calculate a relative distance between the measurement center point position of the quadrilateral and the preset center point position, the relative distance will also be a result with a larger error. In this step, the shape of the target area to be measured may be compared with the preset shape to obtain the similarity of the two shapes, and when the similarity is greater than the third preset threshold, the relative distance between the measurement center point position of the target area to be measured and the preset center point position may then be determined. According to the embodiments of the present application, a PPA offset may be measured more accurately, and then a PPA compensation value may be determined to avoid the occurrence of a color mixing phenomenon.

So far, according to the positioning method provided by embodiments of the present application, the method determines a target area to be measured and a first gray-scale change area adjacent to the target area to be measured by acquiring a gray-scale image of an object to be measured and based on a gray-scale value of each pixel on the gray-scale image, determines a target gray-scale value using the target area to be measured and the first gray-scale change area, and determines actual edge pixels of the target area to be measured in the first gray-scale change area using the target gray-scale value, and thus determines a relative distance between a center position of the target area to be measured and a reference position, to obtain position information of the target area to be measured. On one hand, a boundary of the target area to be measured can be determined more accurately, and thus a position of the target area to be measured can be determined more accurately. On the other hand, according to embodiments of the present application, manual measurement with naked eyes is not required, and automatic measurement can be realized and efficiency can be improved.

Figure 4:
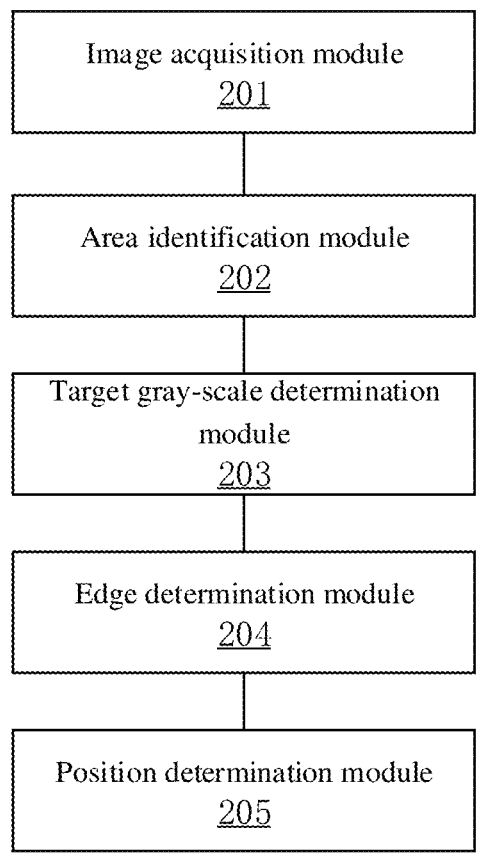
FIG. 4 is a schematic structural diagram of a positioning device provided by an embodiment of the present application.

FIG. 4 is a schematic structural diagram of a positioning device provided by an embodiment of the present application. As shown in FIG. 4, the positioning device provided by the embodiment of the present application may include the following modules: an image acquisition module 201 configured to acquire a gray-scale image of an object to be measured to determine a gray-scale value of each pixel on the gray-scale image; an area identification module 202 configured to determine a target area to be measured in the gray-scale image and a first gray-scale change area adjacent to the target area to be measured based on the gray-scale value of each pixel on the gray-scale image; a target gray-scale determination module 203 configured to determine a target gray-scale value based on a gray-scale value of the target area to be measured and a gray-scale value of each pixel in the first gray-scale change area; an edge determination module 204 configured to determine target pixels that conform to the target gray-scale value in the first gray-scale change area, to use the target pixels as actual edge pixels of the target area to be measured; and a position determination module 205 configured to determine a relative distance between a center position of the target area to be measured and a reference position based on the actual edge pixels of the target area to be measured, to obtain position information of the target area to be measured.

Optionally, the area identification module 202 may be specifically configured to: determine a first gray-scale value and a second gray-scale value based on the gray-scale value of each pixel on the gray-scale image; identify a first pixel in the gray-scale image with a gray-scale value equal to the first gray-scale value, to determine an area where the first pixel is located as the target area to be measured; identify a second pixel in the gray-scale image with a gray-scale value between the first gray-scale value and the second gray-scale value; and determine an area where the second pixel is located as the first gray-scale change area.

Optionally, the target gray-scale determination module 203 may be specifically configured to: determine multiple groups of candidate pixels in the first gray-scale change area based on the gray-scale value of each pixel in the first gray-scale change area, wherein for each of the multiple groups of candidate pixels, a difference between gray-scale values of the candidate pixels is greater than a first preset threshold and the candidate pixels are adjacent to each other; and determine, an average value of gray-scale values of the multiple groups of candidate pixels being close to the gray-scale value of the target area to be measured, as the target gray-scale value.

Optionally, the edge determination module 204 may be specifically configured to: determine M pixels in the first gray-scale change area based on the gray-scale value of each pixel in the first gray-scale change area and the target gray-scale value, wherein each of the M pixels has a gray-scale value equal to the target gray-scale value; and determine N pixels from the M pixels to use the N pixels as the target pixels, wherein a shape formed by a connection of the N pixels is similar to a shape of the target area and a ratio of N to M is greater than a second preset threshold, where M≥N, and M and N are both positive integers greater than 1.

Optionally, the actual edge pixels of the target area to be measured may include actual edge pixels of a first edge of the target area to be measured and actual edge pixels of a second edge of the target area to be measured, the center position of the target area to be measured may be a center line of the target area to be measured, the reference position may be a reference straight line, and the first edge, the second edge, the center line and the reference straight line may be parallel to each other. The position determination module 205 may be specifically configured to: acquire a number and size of pixels between the first edge and the reference straight line and between the second edge and the reference straight line respectively in a direction perpendicular to the first edge; calculate a relative distance between the first edge and the reference straight line and a relative distance between the second edge and the reference straight line respectively based on the number and size of pixels; and determine a relative distance between the center line of the target area to be measured and the reference straight line based on the relative distance between the first edge and the reference straight line and the relative distance between the second edge and the reference straight line.

Optionally, the position determination module 205 may be further configured to: determine a width dimension of the target area to be measured in the direction perpendicular to the first edge, based on the relative distance between the first edge and the reference straight line and the relative distance between the second edge and the reference straight line.

Optionally, the area identification module 202 may be further configured to: determine a reference area in the gray-scale image and a second gray-scale change area adjacent to the reference area based on the gray-scale value of each pixel on the gray-scale image.

The edge determination module 204 may be further configured to: determine actual edge pixels of the reference area in the second gray-scale change area to use a straight line where the actual edge pixels of the reference area are located as the reference straight line.

Optionally, the center position of the target area to be measured may be a measurement center point position of the target area to be measured, the reference position may be a preset center point position corresponding to the target area to be measured, and the position determination module 205 may be specifically configured to: determine a shape of the target area to be measured based on the actual edge pixels of the target area to be measured; compare the shape of the target area to be measured with a preset shape to obtain a similarity between the shape of the target area to be measured and the preset shape; and calculate a relative distance between the measurement center point position of the target area to be measured and the preset center point position when the similarity is greater than a third preset threshold.

According to the positioning device provided by embodiments of the present application, the device determines a target area to be measured and a first gray-scale change area adjacent to the target area to be measured by acquiring a gray-scale image of an object to be measured and based on a gray-scale value of each pixel on the gray-scale image, determines a target gray-scale value using the target area to be measured and the first gray-scale change area, and determines actual edge pixels of the target area to be measured in the first gray-scale change area using the target gray-scale value, and thus determines a relative distance between a center position of the target area to be measured and a reference position, to obtain position information of the target area to be measured. On one hand, a boundary of the target area to be measured can be determined more accurately, and thus a position of the target area to be measured can be determined more accurately. On the other hand, according to embodiments of the present application, manual measurement with naked eyes is not required, and automatic measurement can be realized and efficiency can be improved.

The embodiments of the present application also provide a storage medium storing a program thereon, wherein the program, when executed by a processor, implements the positioning method described above.

A functional block shown in the above-mentioned structural block diagram may be implemented as hardware, software, firmware, or a combination thereof. When implemented in hardware, it can be, for example, an electronic circuit, an application specific integrated circuit (ASIC), appropriate firmware, a plug-in, a function card, and so on. When implemented in software, an element of the embodiments of the present application is a program or code segment used to perform a required task. The program or code segment may be stored in a machine-readable medium, or transmitted on a transmission medium or a communication link through a data signal carried in a carrier wave. "Machine-readable medium" may include any medium capable of storing or transmitting information. Examples of machine-readable media include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segment may be downloaded via a computer network such as the Internet, an intranet, and so on.

What is claimed is:

1. A positioning method comprising:
    acquiring a gray-scale image of an object to be measured to determine a gray-scale value of each pixel on the gray-scale image;
    determining a target area to be measured in the gray-scale image and a first gray-scale change area located between a Frit area and a glass plate area;
    determining a target gray-scale value based on a gray-scale value of the target area to be measured and a gray-scale value of each pixel in the first gray-scale change area;
    determining target pixels that conform to the target gray-scale value in the first gray-scale change area, to use the target pixels as actual edge pixels of the target area to be measured; and
    determining a relative distance between a center position of the target area to be measured and a reference position based on the actual edge pixels of the target area to be measured, to obtain position information of the target area to be measured.

2. The method of claim 1, further comprising:
    determining a first gray-scale value and a second gray-scale value based on the gray-scale value of each pixel on the gray-scale image;
    identifying a first pixel in the gray-scale image with a gray-scale value equal to the first gray-scale value, to determine an area where the first pixel is located as the target area to be measured;
    identifying a second pixel in the gray-scale image with a gray-scale value between the first gray-scale value and the second gray-scale value; and
    determining an area where the second pixel is located as the first gray-scale change area.

3. The method of claim 1, further comprising:
    determining multiple groups of candidate pixels in the first gray-scale change area based on the gray-scale value of each pixel in the first gray-scale change area, wherein for each of the multiple groups of candidate pixels, a difference between gray-scale values of the candidate pixels is greater than a first preset threshold and the candidate pixels are adjacent to each other; and
    determining, an average value of gray-scale values of the multiple groups of candidate pixels as the target gray-scale value.

4. The method of claim 1, further comprising:
    determining M pixels in the first gray-scale change area based on the gray-scale value of each pixel in the first gray-scale change area and the target gray-scale value, wherein each of the M pixels has a gray-scale value equal to the target gray-scale value; and
    determining N pixels from the M pixels to use the N pixels as the target pixels, wherein a ratio of N to M is greater than a second preset threshold, where M≥N, and M and N are both positive integers greater than 1.

5. The method of claim 1, wherein the actual edge pixels of the target area to be measured comprise actual edge pixels of a first edge of the target area to be measured and actual edge pixels of a second edge of the target area to be measured, the center position of the target area to be measured is a center line of the target area to be measured, the reference position is a reference straight line, the first edge, the second edge, the center line and the reference straight line are parallel to each other, and the method further comprises:
    acquiring a number and size of pixels between the first edge and the reference straight line and between the second edge and the reference straight line respectively in a direction perpendicular to the first edge;
    calculating a relative distance between the first edge and the reference straight line and a relative distance between the second edge and the reference straight line respectively based on the number and size of pixels; and
    determining a relative distance between the center line of the target area to be measured and the reference straight line based on the relative distance between the first edge and the reference straight line and the relative distance between the second edge and the reference straight line.

6. The method of claim 5, further comprising:
    determining a width dimension of the target area to be measured in the direction perpendicular to the first edge, based on the relative distance between the first edge and the reference straight line and the relative distance between the second edge and the reference straight line.

7. The method of claim 5, further comprising:
    determining a reference area in the gray-scale image and a second gray-scale change area located between a display area and a molybdenum line area; and
    determining actual edge pixels of the reference area in the second gray-scale change area to use a straight line where the actual edge pixels of the reference area are located as the reference straight line.

8. The method of claim 1, wherein the center position of the target area to be measured is a measurement center point position of the target area to be measured, the reference position is a preset center point position corresponding to the target area to be measured, and the method further comprises:
- determining a shape of the target area to be measured based on the actual edge pixels of the target area to be measured;
- comparing the shape of the target area to be measured with a preset shape to obtain a similarity between the shape of the target area to be measured and the preset shape; and
- calculating a relative distance between the measurement center point position of the target area to be measured and the preset center point position when the similarity is greater than a third preset threshold.

9. A positioning device comprising a processor having a program that implements a method, wherein the processor is configured to:
- acquire a gray-scale image of an object to be measured to determine a gray-scale value of each pixel on the gray-scale image;
- determine a target area to be measured in the gray-scale image and a first gray-scale change area located between a Frit area and a glass plate area;
- determine a target gray-scale value based on a gray-scale value of the target area to be measured and a gray-scale value of each pixel in the first gray-scale change area;
- determine target pixels that conform to the target gray-scale value in the first gray-scale change area, to use the target pixels as actual edge pixels of the target area to be measured; and
- determine a relative distance between a center position of the target area to be measured and a reference position based on the actual edge pixels of the target area to be measured, to obtain position information of the target area to be measured.

10. The positioning device of claim 9, wherein the processor is further configured to:
- determine a first gray-scale value and a second gray-scale value based on the gray-scale value of each pixel on the gray-scale image;
- identify a first pixel in the gray-scale image with a gray-scale value equal to the first gray-scale value, to determine an area where the first pixel is located as the target area to be measured;
- identify a second pixel in the gray-scale image with a gray-scale value between the first gray-scale value and the second gray-scale value; and
- determine an area where the second pixel is located as the first gray-scale change area.

11. The positioning device of claim 9, wherein the processor is further configured to:
- determine multiple groups of candidate pixels in the first gray-scale change area based on the gray-scale value of each pixel in the first gray-scale change area, wherein for each of the multiple groups of candidate pixels, a difference between gray-scale values of the candidate pixels is greater than a first preset threshold and the candidate pixels are adjacent to each other; and
- determine, an average value of gray-scale values of the multiple groups of candidate pixels as the target gray-scale value.

12. The positioning device of claim 9, wherein the processor is further configured to:
- determine M pixels in the first gray-scale change area based on the gray-scale value of each pixel in the first gray-scale change area and the target gray-scale value, wherein each of the M pixels has a gray-scale value equal to the target gray-scale value; and
- determine N pixels from the M pixels to use the N pixels as the target pixels, wherein a ratio of N to M is greater than a second preset threshold, where M≥N, and M and N are both positive integers greater than 1.

13. The positioning device of claim 9, wherein the actual edge pixels of the target area to be measured comprise actual edge pixels of a first edge of the target area to be measured and actual edge pixels of a second edge of the target area to be measured, the center position of the target area to be measured is a center line of the target area to be measured, the reference position is a reference straight line, the first edge, the second edge, the center line and the reference straight line are parallel to each other, and the processor is further configured to:
- acquire a number and size of pixels between the first edge and the reference straight line and between the second edge and the reference straight line respectively in a direction perpendicular to the first edge;
- calculate a relative distance between the first edge and the reference straight line and a relative distance between the second edge and the reference straight line respectively based on the number and size of pixels; and
- determine a relative distance between the center line of the target area to be measured and the reference straight line based on the relative distance between the first edge and the reference straight line and the relative distance between the second edge and the reference straight line.

14. The positioning device of claim 13, wherein the processor is further configured to:
- determine a width dimension of the target area to be measured in the direction perpendicular to the first edge, based on the relative distance between the first edge and the reference straight line and the relative distance between the second edge and the reference straight line.

15. The positioning device of claim 13, wherein the processor is further configured to:
- determine a reference area in the gray-scale image and a second gray-scale change area located between a display area and a molybdenum line area, and
- determine actual edge pixels of the reference area in the second gray-scale change area to use a straight line where the actual edge pixels of the reference area are located as the reference straight line.

16. The positioning device of claim 9, wherein the center position of the target area to be measured is a measurement center point position of the target area to be measured, the reference position is a preset center point position corresponding to the target area to be measured, and the processor is further configured to:
- determine a shape of the target area to be measured based on the actual edge pixels of the target area to be measured;
- compare the shape of the target area to be measured with a preset shape to obtain a similarity between the shape of the target area to be measured and the preset shape; and
- calculate a relative distance between the measurement center point position of the target area to be measured and the preset center point position when the similarity is greater than a third preset threshold.

17. A non-transitory computer readable storage medium storing a program thereon, wherein the program, when executed by a processor, implements a positioning method by executing:
- instructions for acquiring a gray-scale image of an object to be measured to determine a gray-scale value of each pixel on the gray-scale image;
- instructions for determining a target area to be measured in the gray-scale image and a first gray-scale change area located between a Frit area and a glass plate area;
- instructions for determining a target gray-scale value based on a gray-scale value of the target area to be measured and a gray-scale value of each pixel in the first gray-scale change area;
- instructions for determining target pixels that conform to the target gray-scale value in the first gray-scale change area, to use the target pixels as actual edge pixels of the target area to be measured; and
- instructions for determining a relative distance between a center position of the target area to be measured and a reference position based on the actual edge pixels of the target area to be measured, to obtain position information of the target area to be measured.

* * * * *